Figure 1:
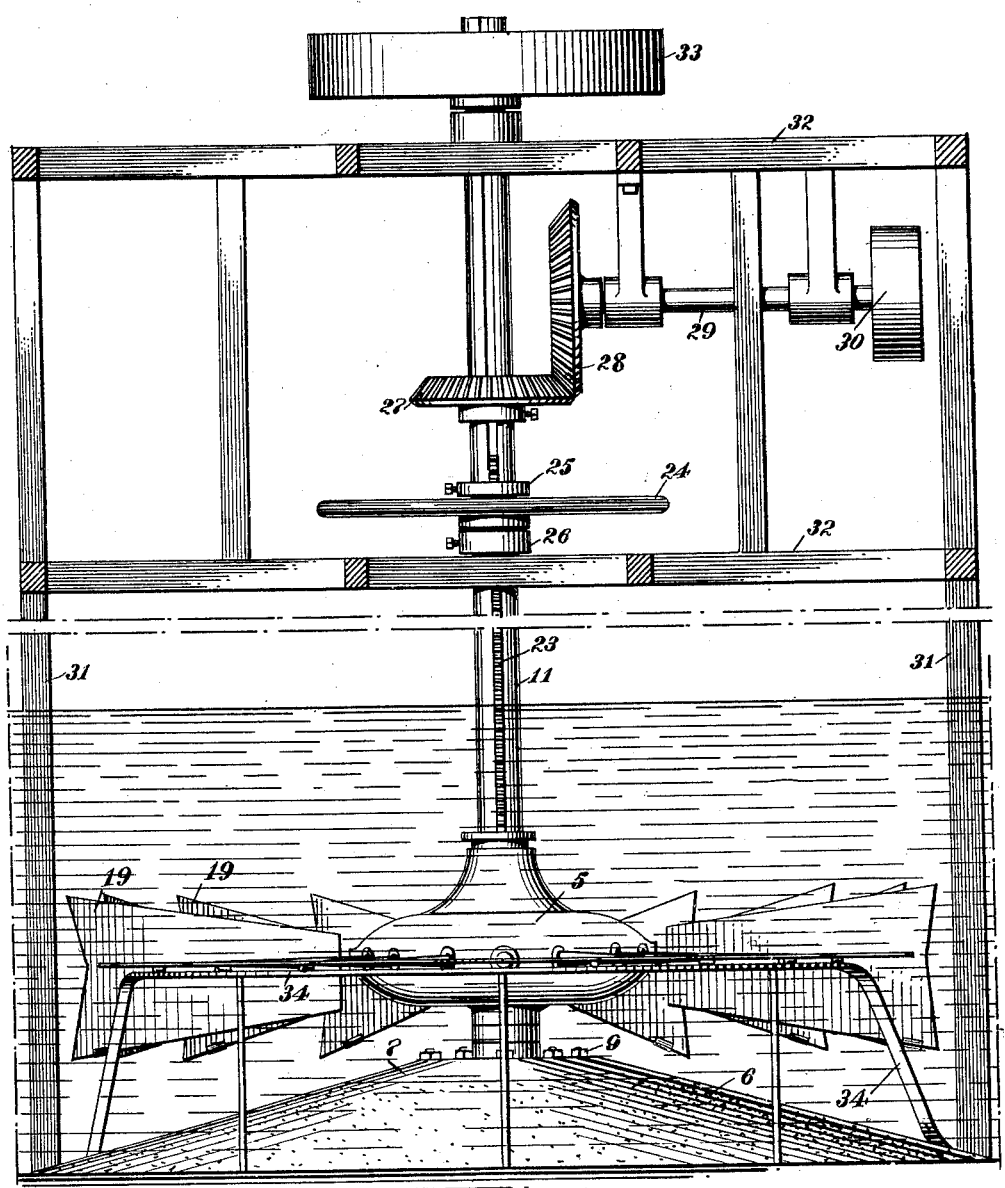

G. A. HESSE.
CURRENT WATER WHEEL.
APPLICATION FILED MAY 26, 1909.
965,108.
Patented July 19, 1910.
5 SHEETS—SHEET 2.
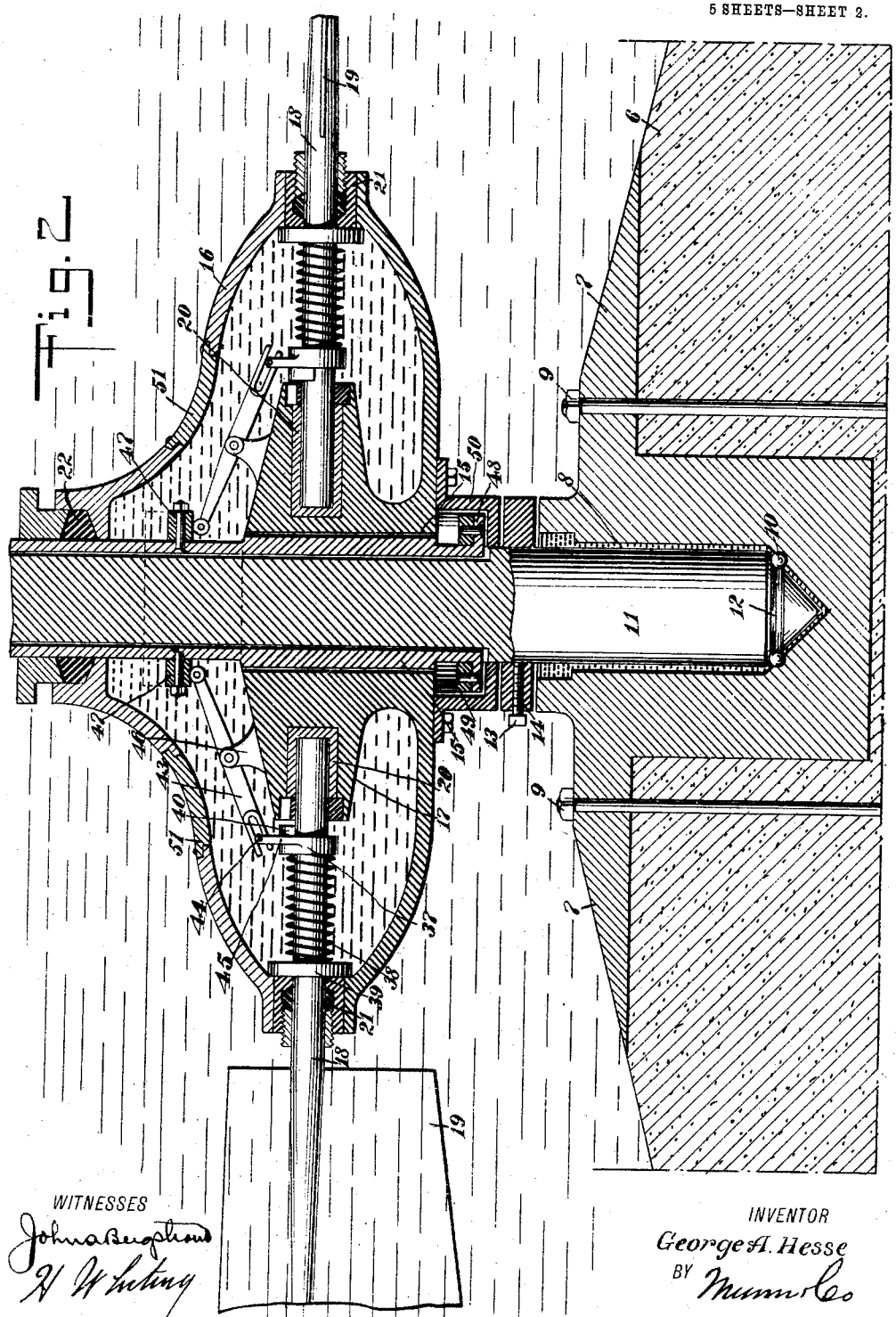
WITNESSES
INVENTOR
George A. Hesse
BY
ATTORNEYS G. A. HESSE.
CURRENT WATER WHEEL.
APPLICATION FILED MAY 26, 1909.
965,108.
Patented July 19, 1910.
5 SHEETS—SHEET 3.
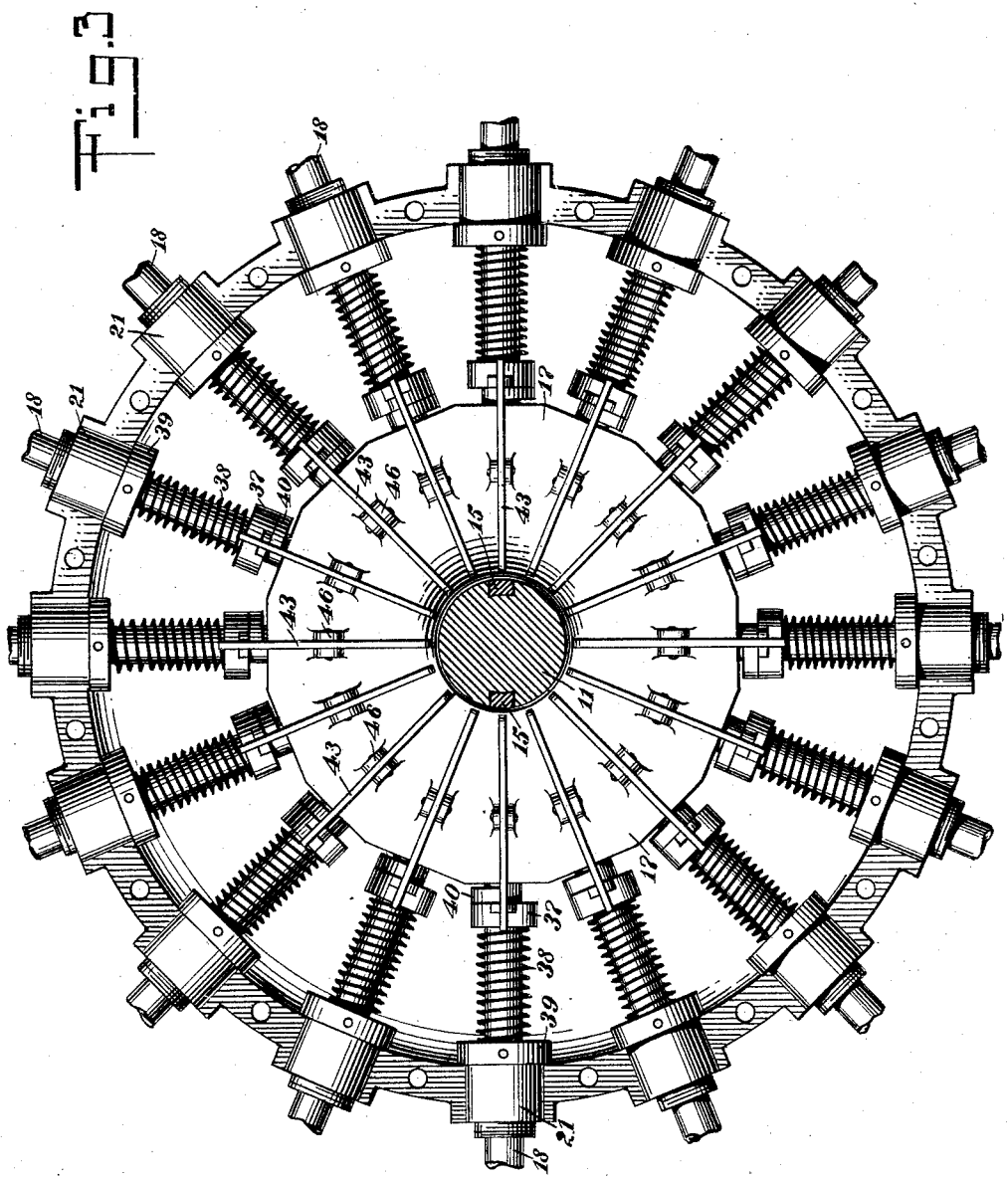
WITNESSES
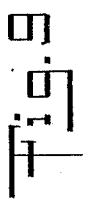
INVENTOR
George A. Hesse
BY
ATTORNEYS G. A. HESSE.
CURRENT WATER WHEEL.
APPLICATION FILED MAY 26, 1909.
965,108.
Patented July 19, 1910.
5 SHEETS—SHEET 4.
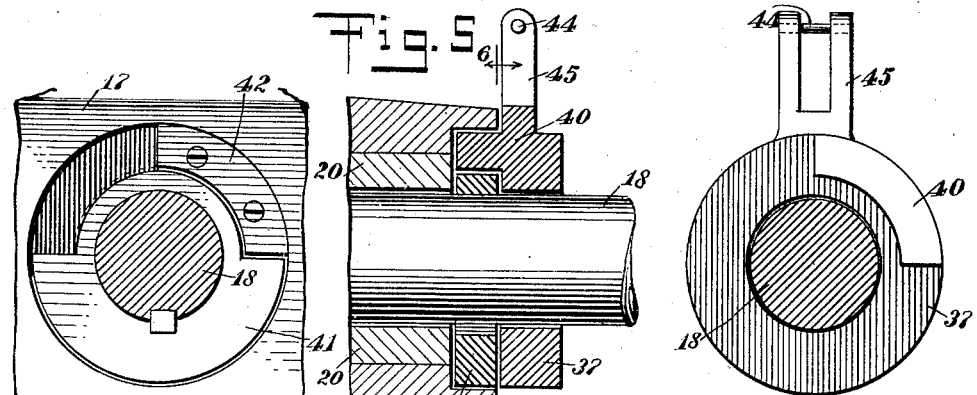
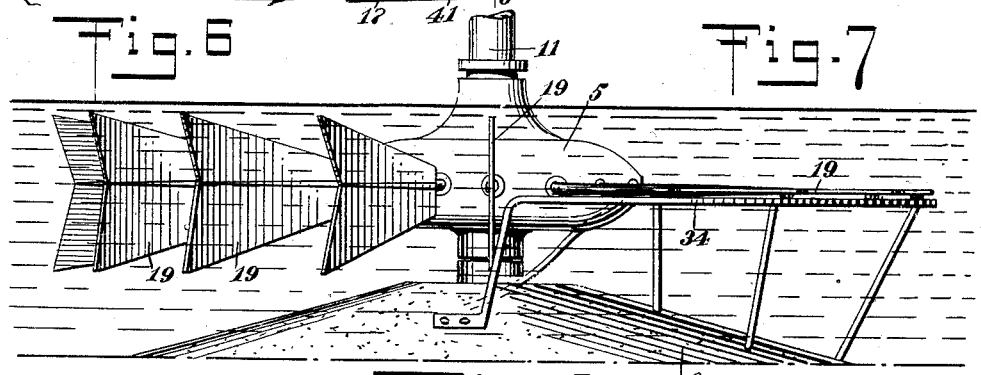
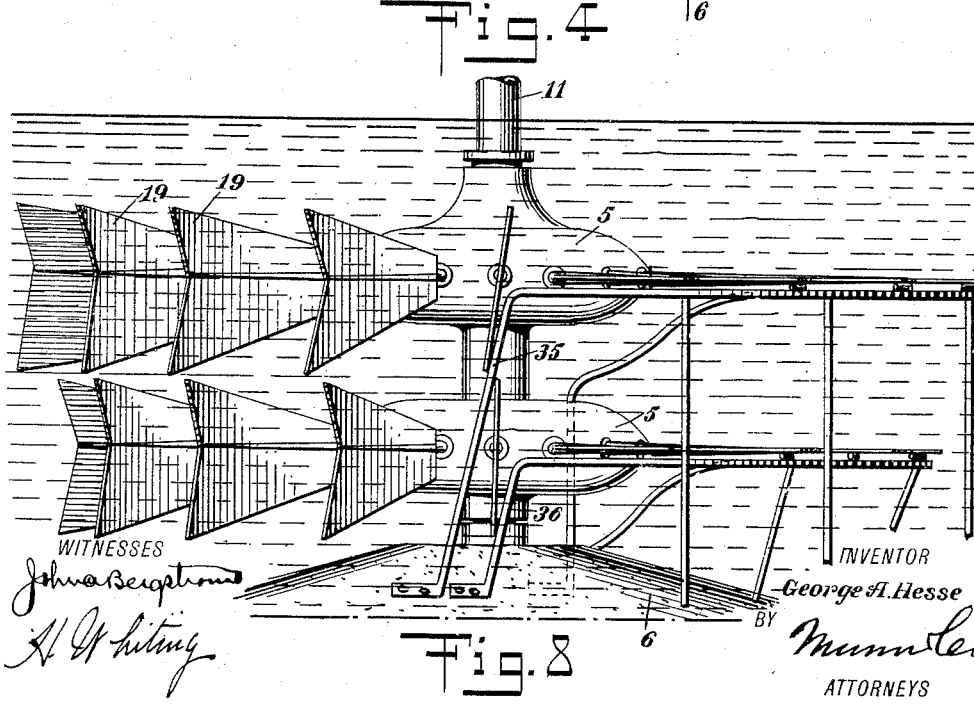
INVENTOR
George A. Hesse
BY
ATTORNEYS G. A. HESSE.
CURRENT WATER WHEEL.
APPLICATION FILED MAY 26, 1909.
965,108.
Patented July 19, 1910.
5 SHEETS—SHEET 5.
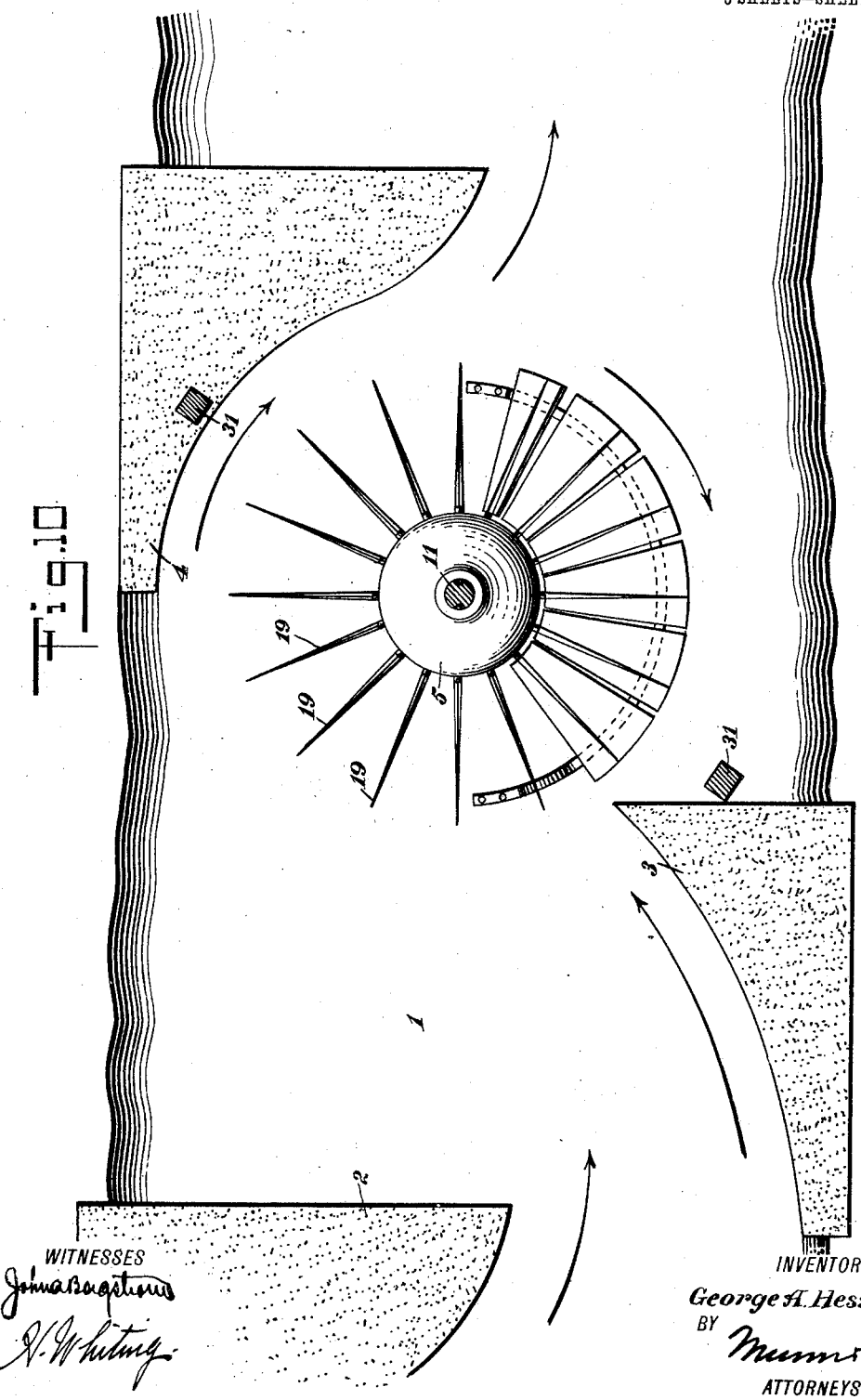
WITNESSES
INVENTOR
George A. Hesse
BY
ATTORNEYS

UNITED STATES PATENT OFFICE.

GEORGE ALBERT HESSE, OF WALLACE, IDAHO, ASSIGNOR TO IDAHO HOLDING CO., OF WALLACE, IDAHO.

CURRENT WATER-WHEEL.

965,108.  Specification of Letters Patent.  Patented July 19, 1910.

Application filed May 26, 1909. Serial No. 498,415.

*To all whom it may concern:*

Be it known that I, GEORGE A. HESSE, a citizen of the United States, and a resident of Wallace, in the county of Shoshone and State of Idaho, have invented a new and Improved Current Water-Wheel, of which the following is a full, clear, and exact description.

This invention relates to a new and improved water wheel adapted to be operated in a flowing stream or wherever there is sufficient current of water to generate power, to be used in any well-known manner.

An object of the invention is to provide a current water-wheel which will be simple in construction, highly efficient in its operation, and also strong and durable.

Another object of the invention is to provide means for deflecting the current to the water-wheel, so that a majority of the blades of the paddles will be exposed to the force of the current all the time.

Another object of the invention is to provide a new and improved bearing whereby the same may be protected from rusting and also from the abrading action of sand, grit or the like.

A further object of the invention is to provide means whereby the paddles on a plurality of superposed water-wheels may be feathered intermittently for a short space of time; and also means whereby said paddles may be feathered continuously to throw the wheels out of operation.

A still further object of the invention is to provide means whereby the water-wheel may be lifted bodily out of the water, for the purpose of repairing the same, or for the purpose of storing the wheel during the winter.

These and further objects will be more fully described hereinafter and particularly pointed out in the claims.

Reference is to be had to the accompanying drawings forming a part of this specification, in which similar characters of reference indicate corresponding parts in all the views, and in which—

Figure 1 is a view in elevation, showing the completed device with only one water-wheel; Fig. 2 is a vertical section through the center of a water-wheel; Fig. 3 is a horizontal section through the hub of the water-wheel; Fig. 4 is a view in elevation, showing the manner of feathering a single water-wheel; Fig. 5 is an enlarged vertical section, showing the manner of locking the blades in their feathered position; Fig. 6 is a vertical section on the line 6—6 in Fig. 5, looking from right to left; Fig. 7 is a vertical section on the line 6—6 in Fig. 5, looking from left to right; Fig. 8 is a view in elevation, showing the manner of feathering the blades on a plurality of water-wheels; Fig. 9 is a vertical fragmentary section, showing the means of permitting the locking of the blades in their feathered position; and Fig. 10 is a horizontal sectional view, showing the method of placing the water-wheel in a stream, relative to staggered abutments, whereby the greatest efficiency of the current may be obtained.

Referring to Fig. 10 of the drawings, 1 indicates a stream, in which are placed suitable abutments 2, 3 and 4, which are so curved and staggered relative to each other as to direct the current of the stream so that it will impinge on a majority of the paddles on a water-wheel 5, which is juxtaposed to said abutments in the course of the stream.

There is provided a suitable foundation 6 for the water-wheel 5, which may be of any suitable material, such as masonry, and has secured at the apex thereof a suitable step-bearing 7, which preferably consists of a casting having a central cavity 8, and which is adapted to be secured in any well-known manner to the foundation 6, as by means of anchor-bolts 9. The cavity 8 in the step-bearing 7 is preferably conical at the bottom, and enlarged at the top, and also has a raceway in the conical bottom thereof, which is adapted to contain suitable roller-bearings 10. The step-bearing 7 is adapted to receive in the cavity 8 a suitable vertical shaft 11, which has a raceway 12 on the bottom thereof, which is adapted to engage the roller-bearings 10, whereby the shaft is supported in the step-bearing 7. The space between the shaft 11 and the step-bearing 7 is preferably filled with a suitable liquid, which preferably has a specific gravity greater than that of water, this liquid being preferably mercury.

Directly above the step-bearing 7 and secured to the shaft 11 by any suitable means, such as a set-screw 13, there is provided a collar 14, which covers the cavity in the step-bearing, and prevents to a certain extent, large particles crowding around the shaft.

Secured to the shaft 11 by means of vertical keys 15, is a casing 16, formed of separable upper and lower members, which are adapted to be joined in any well-known manner, as by means of bolts or the like. The casing 16 has a hub 17 extending from the bottom thereof into the interior, which has a plurality of sockets in which are rotatably supported, shafts 18, to which are secured on the outer extremities thereof, blades 19. The shafts 18 do not directly bear on the hub 17, but have interposed between them and the hub suitable brass boxes 20, which are adapted to receive the wear. The blades 19 and shafts 18 together form suitable paddles.

The casing 16 is preferably air and water-tight, and has suitable stuffing-boxes 21 where the shafts 18 extend outwardly through the casing; and also has a suitable stuffing box 22 where the shaft 11 extends through the casing. The casing 16 is preferably filled with a suitable lubricant, such as oil, to allow the parts therein to work smoothly.

The keys 15, hereinbefore mentioned, are adapted to slide vertically in the grooves in the shaft 11 and extend upwardly through the stuffing-box 22, above which they are provided with screw-threads, as at 23, which are adapted to be engaged by a screw-threaded opening in a wheel 24, whereby the keys 15 may be raised or lowered. The purpose of this will be described hereinafter.

Directly above and below the wheel 24, there are provided suitable collars 25 and 26, which are secured to the shaft 11 and prevent the wheel from sliding up and down on said shaft. Directly above the collar 25, there is provided a suitable bevel-gear 27, secured to the shaft 11 and meshing with a bevel-gear 28, which is secured to a shaft 29, having a suitable driving connection on the opposite end, such as a belt-pulley 30. The shaft 29, together with the shaft 11, is supported in a suitable framework which consists of vertical members 31 and horizontal members 32, which are suitably braced one to the other. The shaft 11 has at the top thereof a suitable fly-wheel 33, which is adapted to store up the energy generated by the water-wheel.

The blades 19 are preferably diverging in form from their inner ends outward, and are also preferably eccentrically secured to the shafts 18, whereby the greatest extent of the surface and the greatest weight of the blades are located below the shafts 18. While the blades 19 are held in a vertical plane and exposed to the action of the current for a portion of their revolution, they are adapted to engage a suitable turning device, which consists of a cam-rail 34, suitably secured to the foundation 1. This cam-rail is adapted to engage each blade successively and turn it to a horizontal position, where it rests on the top of said rail.

In the case where a plurality of superposed water-wheels are used, as shown in Fig. 8, the blades on the highest wheel are longest, and extend out to a cam-rail 35, whereby they are tilted to their feathered position, and the blades on the lower wheels are somewhat shorter than the blades on the upper wheel or wheels, and are adapted to be engaged by a cam-rail 36 of less height than the cam-rail 35, and located nearer to the shaft of the water-wheels.

When it is desired to lock the blades in their feathered position, so that any one of the wheels may be thrown out of commission, each of the shafts 18 is locked to the hub 17 by means of a locking collar 37, which is loosely secured on the shaft 18, and is normally pressed inward toward the hub 17 by means of a spring 38, which bears on its opposite end on a collar 39 secured to the shaft 18. The locking collar 37 has a lug 40 extending inwardly toward the hub 17, which is adapted to engage between a semi-circular member 41, which is keyed onto the shaft 18, and a quadrant-shaped segment 42, which is secured in any well-known manner to the hub 17. This construction is fully illustrated in Figs. 5, 6 and 7, and it will there be seen that by the lug 40 entering between the semi-circular member 41 and the segment 42, it will prevent the rotation of the shaft 18 relative to the hub 17, and since this space is only opened when the blade 19 is in its feathered position, the blade will be locked in its feathered position until released.

In order to prevent the blades 19 from locking in their feathered position under normal conditions, there is provided a bifurcated lever 43 for each of the collars 37, which is adapted to engage a pivot-pin 44 secured on a lug 45 extending from each of the collars 37. The levers 43 are pivoted intermediate their ends by suitable fulcrums 46 on the hub 17, and abut at their opposite ends against the under side of a collar 47 secured on the sliding keys 15. It will thus be seen by raising the keys 15 by means of the hand-wheel 24, that the levers 43 will be raised up at their inner ends and depressed at their lower ends, permitting the collars 37 to be forced inwardly by the springs 38, and put them in the position where they may lock the shafts 18 to the hub 17.

In order to unlock the shafts 18 from the hub 17, the hand-wheel 24 is rotated in the opposite direction, thereby depressing the keys 15, and with them the inner ends of the levers 43, and thus raising the outer ends of said levers, whereby the collars 37 are forced outwardly by the bifurcated cam-surfaces of the levers, permitting the shafts 18 to rotate independently of the hub 17.

It is also to be noted that the semi-circular member 41 permits the shafts 18, and hence the blades 19, to rotate nearly through a quarter of a revolution, before being stopped by the segment 42, whereby the blades 19 are held in a vertical position, exposing the greatest mount of surface to the action of the current.

When it is desired to raise the wheel completely out of the water, the hand-wheel 24 is rotated, so as to draw the keys 15 upwardly until the flanges 48 on the bottom thereof come in contact, through an intermediate washer 49, with the lower surface of the casing 16, whereby any further rotation of the wheel 24 will elevate the casing, and together with it the various parts of the wheel.

There is provided a suitable cap 50, which encircles the shaft 11, and is secured to the bottom of the casing 16 in any well-known manner, and acts to protect the lower ends of the keys 15, and is further in the nature of a stuffing-box, to prevent the inflow of water or the outflow of the oil in the casing.

Suitable manholes 51 are provided in the upper part of the casing 16, whereby access may be obtained to the parts within the casing.

The method of using the invention will be readily understood from the above description.

One or more water-wheels are supported in a stream, in such a relation to a plurality of abutments that the current is deflected among the blades of the wheel or wheels, so as to utilize the force of the current on a majority of the blades, and so that the blades not exposed to the best advantage to the current will be feathered, in order to present a sharp edge to the current, thereby preventing any retardation of the device.

By using a mercury bath in the step-bearing, the sand, grit and water are prevented from seeping in between the shaft and the bearing, and grinding and rusting out the same.

By raising the keys 15 slightly, the collars 37 are permitted to enter in between the semi-circular members 41 secured to the shafts 18 and the segments 42 secured to the hub 17, whereby the blades 19 are locked in their feathered position. A further upward movement of the casing will bring the flange on the lower end thereof against the bottom of the casing 16, and raise the whole wheel out of the water.

Having thus described my invention, I claim as new and desire to secure by Letters Patent:—

1. In a device of the class described, the combination with a support, of a plurality of superposed water-wheels on said support, each successive superposed wheel having longer blades than the wheel directly below it, and cams adapted to feather the blades on each of said wheels.

2. In a device of the class described, the combination with a support, of a water-wheel rotatably supported on said support, a hub for said water-wheel, a plurality of shafts rotatably supported on said hub, blades on said shafts, means for normally holding said blades in a vertical position, members on said shafts adapted to limit the rotation of said shafts, and collars on said shafts adapted to engage said members and said hub to lock said blades in their feathered position.

3. In a device of the class described, the combination with a support, of a water-wheel rotatably supported on said support, a hub for said water-wheel, a plurality of shafts rotatably supported in said hub, blades on said shafts, means for feathering said blades, members secured to said shafts, segments secured to said hub, said members being adapted to engage said segments to limit the rotation of said shafts, collars on said shafts adapted to extend between said members and said segments to lock said shafts relative to said hub, springs for normally forcing said collar into engagement with said members and said segments, bifurcated levers adapted to force said collars out of said members and said segments, keys adapted to operate said levers, and means for reciprocating said keys.

4. In a device of the class described, the combination with a support, of a shaft rotatably supported on said support, a hub keyed to said shaft, a plurality of paddles rotatably supported in said hub, members secured to said paddles, segments secured to said hub and adapted to be engaged by said members to limit the rotation of said paddles, collars loosely connected to said paddles and adapted to engage said members and said segments to lock said paddles to said hub, springs adapted to normally force said collars toward said members, means adapted to force said collars against the action of said springs, keys reciprocating in said shaft adapted to operate said last-mentioned means, and means for reciprocating said keys.

5. In a device of the class described, the combination with a support, of a shaft rotatably supported on said support, a water-wheel, keys adapted to secure said water-wheel to said shaft, means for raising said keys, and means on said keys adapted to engage the bottom of said water-wheel, whereby said water-wheel may be raised off said support.

6. In a device of the class described, the combination with a support, of a shaft rotatably supported in said support, a water-wheel, keys splined between said water-wheel and said shaft, whereby said water-wheel is secured to said shaft, flanges on the lower ends of said keys, a washer secured to said flanges and adapted to engage the bottom of said water-wheel, screw-threads on the upper ends of said keys, and means adapted to engage said screw-threads, whereby said keys and said water-wheel may be raised or lowered.

7. In a device of the class described, the combination with a support, of a shaft rotatably supported in said support, a casing secured to said shaft, a hub extending inwardly from said casing, a plurality of paddles rotatably secured in said hub and said casing, stuffing boxes in said casing at the junctions of said paddles with said casing and said shaft with said casing, means for normally holding said paddles exposed to the action of the stream, means for feathering said paddles, means for locking said paddles in their feathered position, means tending normally to force said last-mentioned means into operation, and means for forcing said last-mentioned means out of operation.

8. In a device of the class described, the combination with a support, of a step-bearing in said support, a shaft rotatably supported in said step-bearing, a mercury bath interposed between said bearing and said shaft, a water-wheel, keys for securing said water-wheel to said shaft, a water-tight casing for said water-wheel, a hub extending inwardly from said casing, a plurality of shafts rotatably supported in said hub and said casing, blades eccentrically secured to said shaft, means for feathering said blades, locking collars on said shaft, locking members secured to said shaft, segments secured to said hub adapted to co-act with said locking members, spring means for normally forcing said locking collars into engagement with said locking members and said segments, means for forcing said locking collars out of engagement, and means whereby said keys are adapted to operate said last-mentioned means.

9. In a device of the class described, the combination with a support, of a step-bearing on said support, a shaft, roller-bearings between said shaft and said step-bearing, a mercury bath interposed between said step-bearing and said shaft, a collar secured to said shaft, a water-wheel secured to said shaft, keys for securing said water-wheel to said shaft, a water-tight casing for said water-wheel, an inwardly-extending hub on said casing, a plurality of bearings in said hub, a plurality of journal-boxes in said bearings, a plurality of shafts rotatably supported in said bearings, blades eccentrically secured to said shaft, locking collars loosely mounted on said shafts, a lug on each of said collars, locking members on each of said shafts, segments secured to said hub adapted to engage said locking members to limit the rotation of said shaft, means for normally forcing said lugs in between said locking members and said segments, cam-levers for forcing said lugs out of engagement with said locking members and said segments, means whereby said keys are adapted to operate said cam-levers, means for reciprocating said keys, flanges on said keys, a ring secured to said flanges and adapted to engage the bottom of said casing, whereby said casing and said water-wheel may be raised or lowered, and a cap secured to the bottom of said casing and inclosing said flanges on said keys.

10. In a device of the class described, the combination with a rotatable shaft, of a hub on said shaft, shafts pivotally connected to said hub, blades on said shafts, and means on said shafts adapted to engage said hub to lock said shafts to said hub.

11. In a device of the class described, the combination with a shaft, of a hub connected to said shaft, a plurality of paddles rotatably supported in said hub, means normally tending to lock said paddles against rotation relative to said hub, and means for controlling said last-mentioned means.

In testimony whereof I have signed my name to this specification in the presence of two subscribing witnesses.

GEORGE ALBERT HESSE.

Witnesses:
C. C. BREUER,
EDWARD G. STOEKERT.